US012215717B2

(12) United States Patent
Eckard, Jr. et al.

(10) Patent No.: US 12,215,717 B2
(45) Date of Patent: Feb. 4, 2025

(54) BLOWER VACUUM

(71) Applicant: TECHTRONIC CORDLESS GP, Anderson, SC (US)

(72) Inventors: Lance Eckard, Jr., Anderson, SC (US); Christopher A. Holman, Clemson, SC (US); Ronald J. Hoffman, Iva, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/588,710

(22) Filed: Feb. 27, 2024

(65) Prior Publication Data
US 2024/0200577 A1 Jun. 20, 2024

Related U.S. Application Data

(63) Continuation of application No. 18/120,655, filed on Mar. 13, 2023, now Pat. No. 11,946,490.

(60) Provisional application No. 63/319,462, filed on Mar. 14, 2022, provisional application No. 63/319,466, filed on Mar. 14, 2022.

(51) Int. Cl.
*F04D 29/70* (2006.01)
*A01G 20/47* (2018.01)
*F04D 17/16* (2006.01)
*F04D 29/42* (2006.01)

(52) U.S. Cl.
CPC .......... *F04D 29/703* (2013.01); *A01G 20/47* (2018.02); *F04D 17/16* (2013.01); *F04D 29/4226* (2013.01)

(58) Field of Classification Search
CPC ...... F04D 29/701; F04D 17/16; F04D 29/703; F04D 29/706; F04D 25/06; F04D 29/106; F04D 29/2266; F04D 29/5806; F04D 1/12; F04D 23/003; F04D 25/082; F04D 29/281; F04D 29/30; F04D 31/00; F04D 7/045; F04D 15/0005; F04D 17/04; F04D 17/164; F04D 25/0686; F04D 25/16; F04D 27/009; F04D 29/2288; F04D 29/284; F04D 29/422; F04D 29/4253; F04D 29/441; F04D 29/70; F04D 19/007; F04D 19/042; F04D 23/001; F04D 23/008; F04D 25/04; F04D 25/08; F04D 25/166; F04D 27/008; F04D 27/0215; F04D 27/023; F04D 27/0261; F04D 29/063; F04D 29/083; F04D 29/124; F04D 29/263; F04D 29/287; F04D 29/289; F04D 29/325; F04D 29/36; F04D 29/388; F04D 29/4213; F04D 29/4226; F04D 29/4233; F04D 29/4246; F04D 29/5826; F04D 29/584; F04D 29/5846;
(Continued)

(56) References Cited

U.S. PATENT DOCUMENTS

2007/0295209 A1 * 12/2007 Strauser ................ B01D 45/16
95/271

* cited by examiner

*Primary Examiner* — Brian O Peters
(74) *Attorney, Agent, or Firm* — Dority & Manning, P.A.

(57) ABSTRACT

A blower vacuum, the blower vacuum including a nozzle forming a first opening, a fan housing in fluid communication with the nozzle, an inlet exhaust housing rotatably coupled to the fan housing, and a debris housing. The fan housing forms a second opening. A fan assembly is positioned at the fan housing. The inlet exhaust housing includes an inlet portion and an exhaust portion. The inlet exhaust housing is rotatable to a first position forming a blower operation and a second position forming a vacuum operation. The debris housing is coupled to the exhaust portion of the inlet exhaust housing.

13 Claims, 12 Drawing Sheets

(58) Field of Classification Search
CPC .. F04D 29/626; F04D 29/705; F04D 25/0673; A01G 20/47
See application file for complete search history.

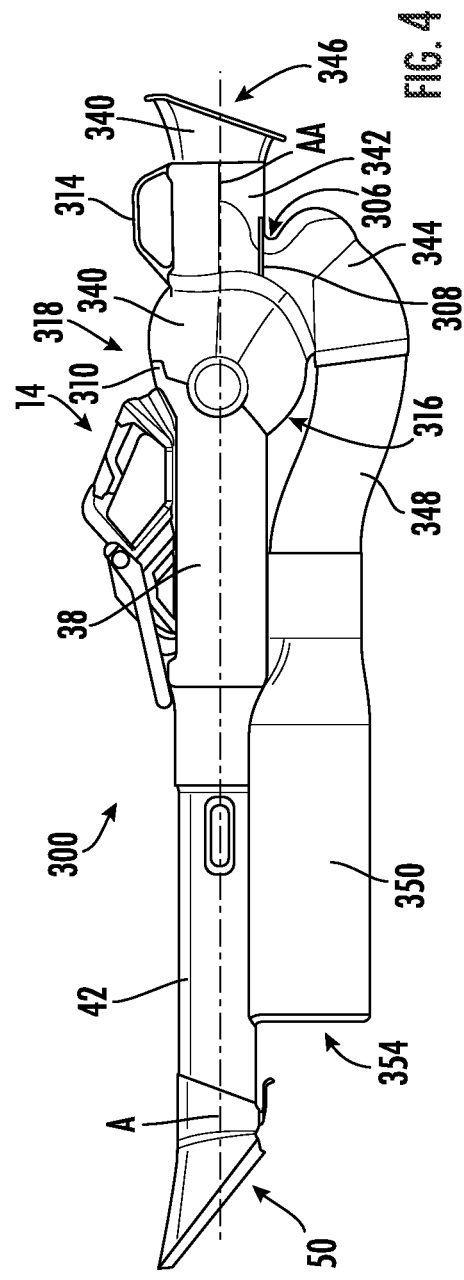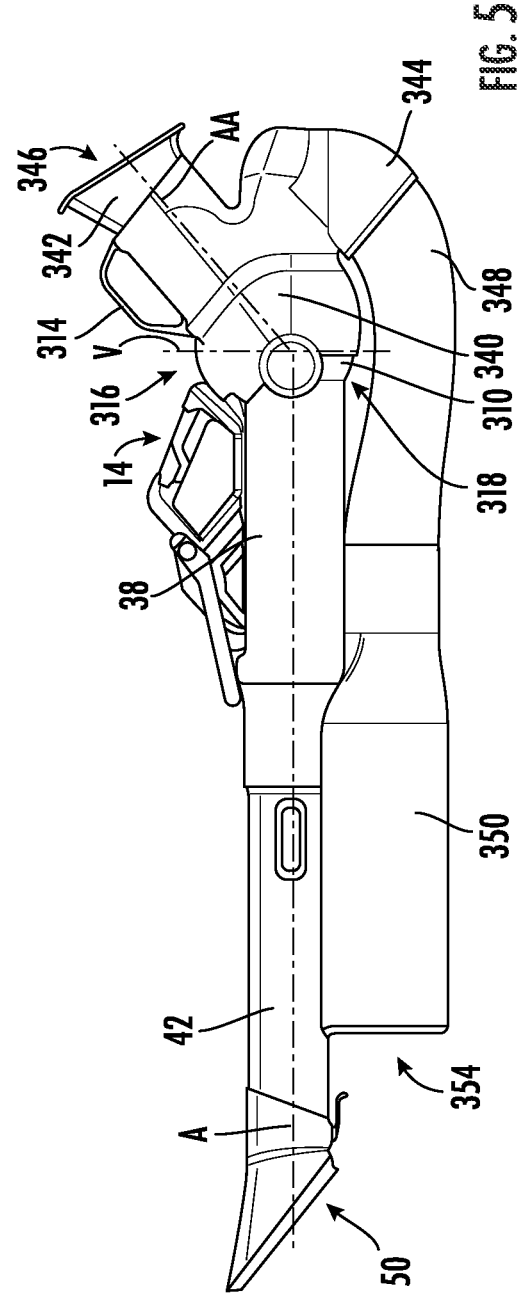

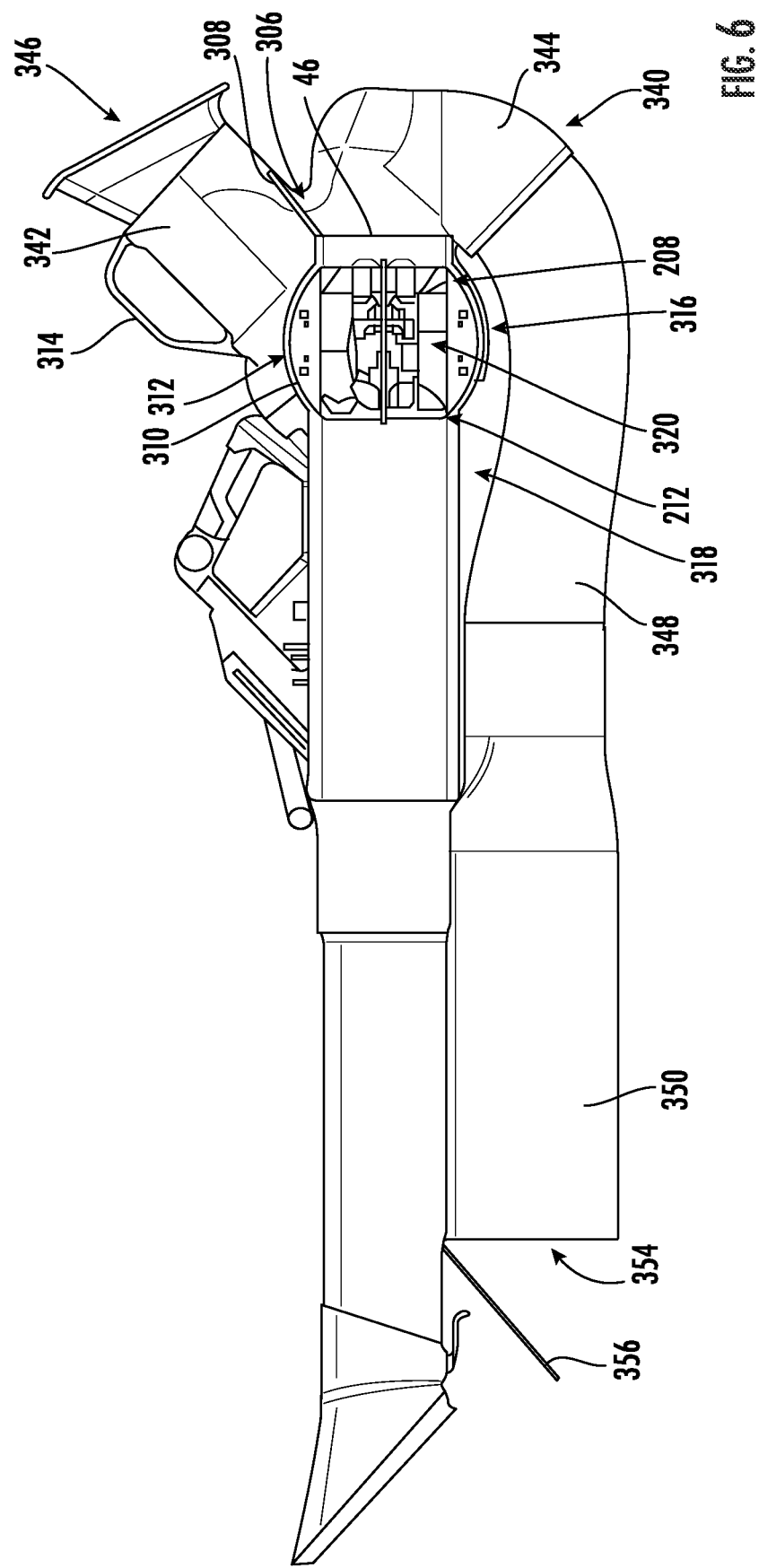

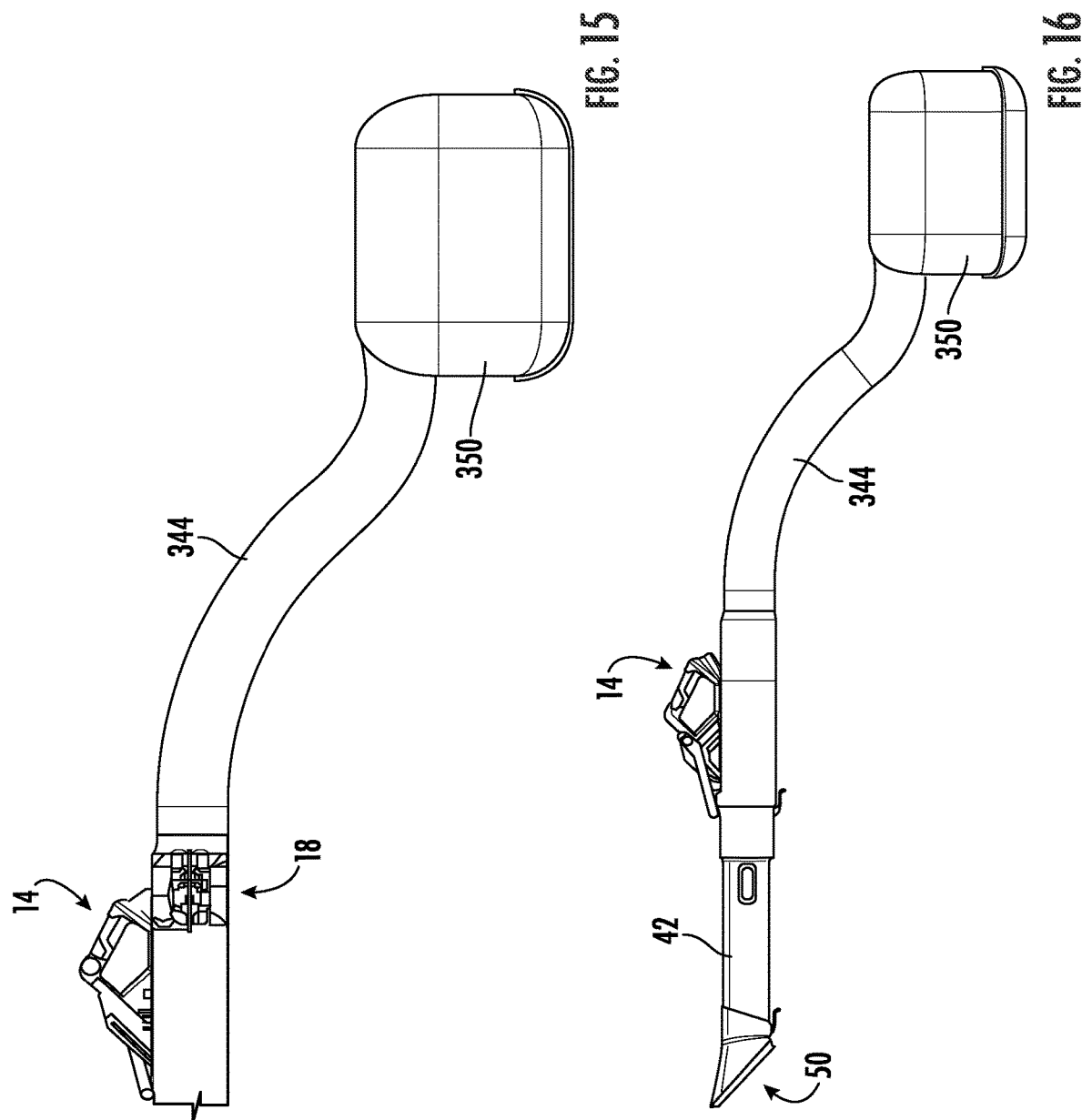

BLOWER VACUUM

CROSS REFERENCE TO RELATED APPLICATIONS

The present application is a continuation of U.S. patent application Ser. No. 18/120,655, filed Mar. 13, 2023, claiming the benefit of priority to U.S. Provisional Patent Application Ser. No. 63/319,466, filed on Mar. 14, 2022, and U.S. Provisional Patent Application Ser. No. 63/319,462, filed on Mar. 14, 2022, the disclosures of which are incorporated by reference herein in their entireties.

FIELD

The present disclosure relates generally to handheld blowers and vacuums.

BACKGROUND

Blower vacuums are generally known. However, improved blower vacuums that facilitate improved debris bagging and/or improved switching between blower operation and vacuum operation would be advantageous.

Accordingly, improved blower vacuums are desired in the art and would be advantageous.

BRIEF DESCRIPTION

Aspects and advantages of the invention in accordance with the present disclosure will be set forth in part in the following description, or may be obvious from the description, or may be learned through practice of the technology.

An aspect of the present disclosure is directed to a blower vacuum. The blower vacuum includes a nozzle forming a first opening, a fan housing in fluid communication with the nozzle, an inlet exhaust housing rotatably coupled to the fan housing, and a debris housing. The fan housing forms a second opening. A fan assembly is positioned at the fan housing. The inlet exhaust housing includes an inlet portion and an exhaust portion. The inlet exhaust housing is rotatable to a first position forming a blower operation and a second position forming a vacuum operation. The debris housing is coupled to the exhaust portion of the inlet exhaust housing.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 4 provides a side view of an embodiment of an axial blower vacuum in a first position in accordance with an aspect of the present disclosure;

FIG. 5 provides a side view of an embodiment of an axial blower vacuum in a second position in accordance with an aspect of the present disclosure;

FIG. 6 provides a side view of an embodiment of an axial blower vacuum in accordance with an aspect of the present disclosure;

FIG. 15 provides a side view of an embodiment of an axial blower vacuum in accordance with an aspect of the present disclosure;

FIG. 16 provides a side view of a portion an embodiment of the axial blower vacuum of FIG. 15 in accordance with an aspect of the present disclosure;

Figure 1:
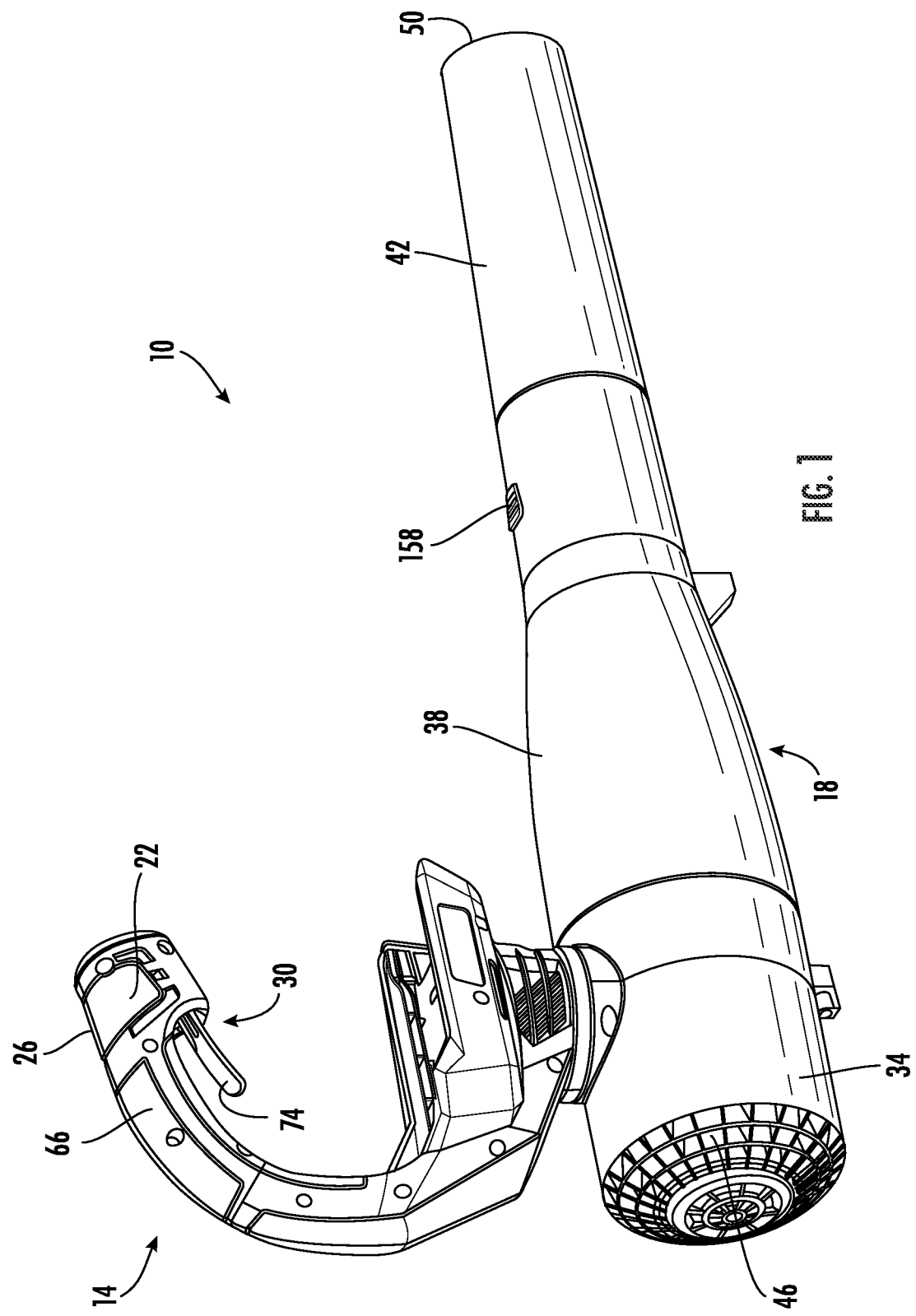
FIG. 1 provides a perspective view of an embodiment of an axial blower vacuum in accordance with an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved blower vacuums. In exemplary embodiments, such blower vacuums include various features that may provide improved debris bagging and/or improved switching between blower operation and vacuum operation, such as depicted and described further herein.

FIG. 1 provides an exemplary embodiment of an axial blower vacuum 10, such as a leaf blower vac. The axial blower vacuum 10 includes a C-shaped handle assembly 14 and a generally in-line blower vacuum assembly 18 that is coupled to the handle assembly 14. The handle assembly 14 includes a right handle portion 22, a left handle portion 26 joined to the right handle portion 22, and a trigger assembly 30 between the right handle portion 22 and the left handle portion 26. The blower vacuum assembly 18 includes an inlet housing 34, an outlet housing 38, and a nozzle 42. When blowing, the blower vacuum assembly 18 is configured to direct air from an inlet opening 46 on the inlet housing 34 to an exhaust opening 50 on the nozzle 42. When vacuuming, the blower vacuum assembly 18 is configured to direct air from the exhaust opening 50 to the inlet opening 46.

Figure 2:
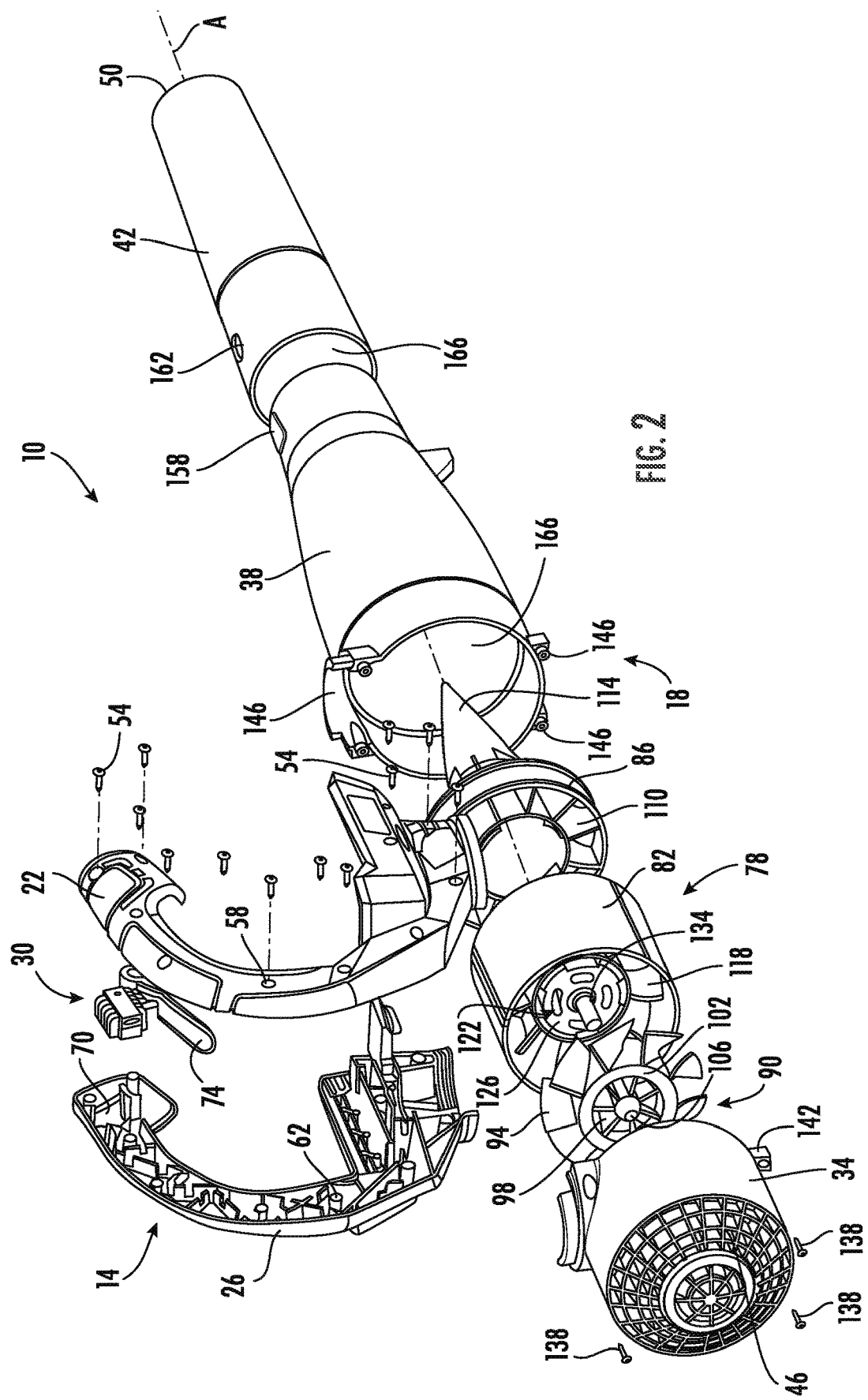
FIG. 2 provides an exploded, perspective view of an embodiment of the axial blower vacuum in accordance with an aspect of the present disclosure.

Referring now to FIG. 2, the handle assembly 14 further includes screws 54 for connecting the right handle portion 22 to the left handle portion 26. The right handle portion 22 has a plurality of openings 58 throughout, which are capable of threadably engaging the screws 54. The screws 54 extend through the openings 58 in the right handle portion 22 to threadably engage elements 62 within the left handle portion 26. When the screws 54 are tightened, e.g., the right handle portion 22 and left handle portion 26 assembled, the right handle portion 22 and the left handle portion 26 are capable of creating a generally uniform and comfortable gripping portion 66 on the exterior of the handle assembly 14.

A recess 70 is formed within the interior of the right handle portion 22 and the left handle portion 26. Specifically, the recess 70 is at an end portion of the handle assembly 14 and proximate to the gripping portion 66. Further, the recess 70 is adapted to fit the trigger assembly 30. The trigger assembly 30 includes a trigger 74 biased in an open position by a spring, but capable of being actuated about a pivot point. In other embodiments, the trigger 74 may be slidably actuated.

Referring to FIG. 2, the axial blower vacuum 10 further includes a fan assembly 78 assembled in the interior of the blower vacuum assembly 18. The fan assembly 78 includes a guide vane housing 82, a tail cone assembly 86, and a fan 90 coupled to the guide vane housing 82. The fan 90 includes a plurality of exterior fan blades 94, a plurality of interior fan blades 98 that are radially separated by a partition 102 from the exterior fan blades 94, and a cavity 106 at the center of the fan 90. The tail cone assembly 86 includes vanes or ribs 110 and a tail cone forming an end point 114 that extends toward the exhaust opening 50. The guide vane housing 82 includes guide vanes 118 radially exterior to an interior motor cavity 122. The motor cavity 122 is shaped to receive a motor 126 for rotating the fan 90. For instance, the guide vane housing 82 forms a hole at the center of the housing 82 configured to receive a drive shaft 134 that extends from the motor 126. A longitudinal axis of the drive shaft 134 defines a motor axis A that is coaxial with a fan blade axis A. Further, the drive shaft 134 is shaped to engage the cavity 106 at the center of the fan 90.

Further referring to FIG. 2, the blower vacuum assembly 18 includes screws 138 for connecting the inlet housing 34 and the outlet housing 38. The inlet housing 34 has outlet mating portions 142 on opposite sides of an exterior of the housing 34. The outlet mating portions 142 being adapted to receive the screws 138 therethrough. Similar to the handle screws 54, the blower vacuum screws 138 extend through the outlet mating portions 142 to threadably engage inlet mating portions 146 disposed on the outlet housing 38. The inlet mating portions 146 and the outlet mating portions 142, when coupled, create a circular opening on a side of the blower vacuum assembly 18. The inlet mating portions 146 and the outlet mating portions 142 create a flange portion that is capable of coupling with the bottom portion of the handle assembly 14.

The circular opening allows for an electrical connection between the trigger assembly 30 and the motor 126. The trigger assembly 30 includes a switch that, when closed through actuation of the trigger 74, allows power to reach the motor 126. When energized, the motor 126 rotates the drive shaft 134, which in turn, rotates the fan 90 and the fan blades 94, 98 creating a forced air flow 170. In some embodiments, the power may be generated through an internally housed battery. In still some embodiments, the power may be generated from an AC source, or alternatively an externally mounted battery such as a power tool battery.

The outlet housing 38 further includes a projection 158 for mating the outlet housing 38 and the nozzle 42 at a mating section. The projection 158 is disposed toward the exhaust opening 50 of the nozzle 42 to minimize overlapping of the outlet housing 38 and the nozzle 42. An opening 162, shaped for fitting the projection 158 therethrough, is disposed on the nozzle 42. The diameter of the outlet housing 38 is less than the diameter of the nozzle 42 at the mating section, when excluding the projection 158, so that the nozzle 42 can be placed within the outlet housing 38. The projection 158 creates a portion of the outlet housing 38 with a greater diameter than that of the nozzle 42 at the mating section. The projection 158 is shaped to create a naturally biased extension through the opening 162. Therefore, when pressed together, the projection 158 couples the outlet housing 38 to the nozzle 42, which can be uncoupled by depressing the projection 158 below the opening.

Further referring to FIG. 2, the blower vacuum assembly 18 defines a passageway 166 on an interior of the inlet housing 34, the outlet housing 38, and the nozzle 42. The passageway 166 is configured to direct the forced air flow 170 from the inlet 46 to the exhaust 50. During rotation, the fan blades 94, 98 direct air from a low pressure region, at or near the inlet 46 while blowing, to a high pressure region, at or near the exhaust opening 50. The passageway 166 is specifically shaped to direct and increase the speed of the air flow 170.

Figure 3:
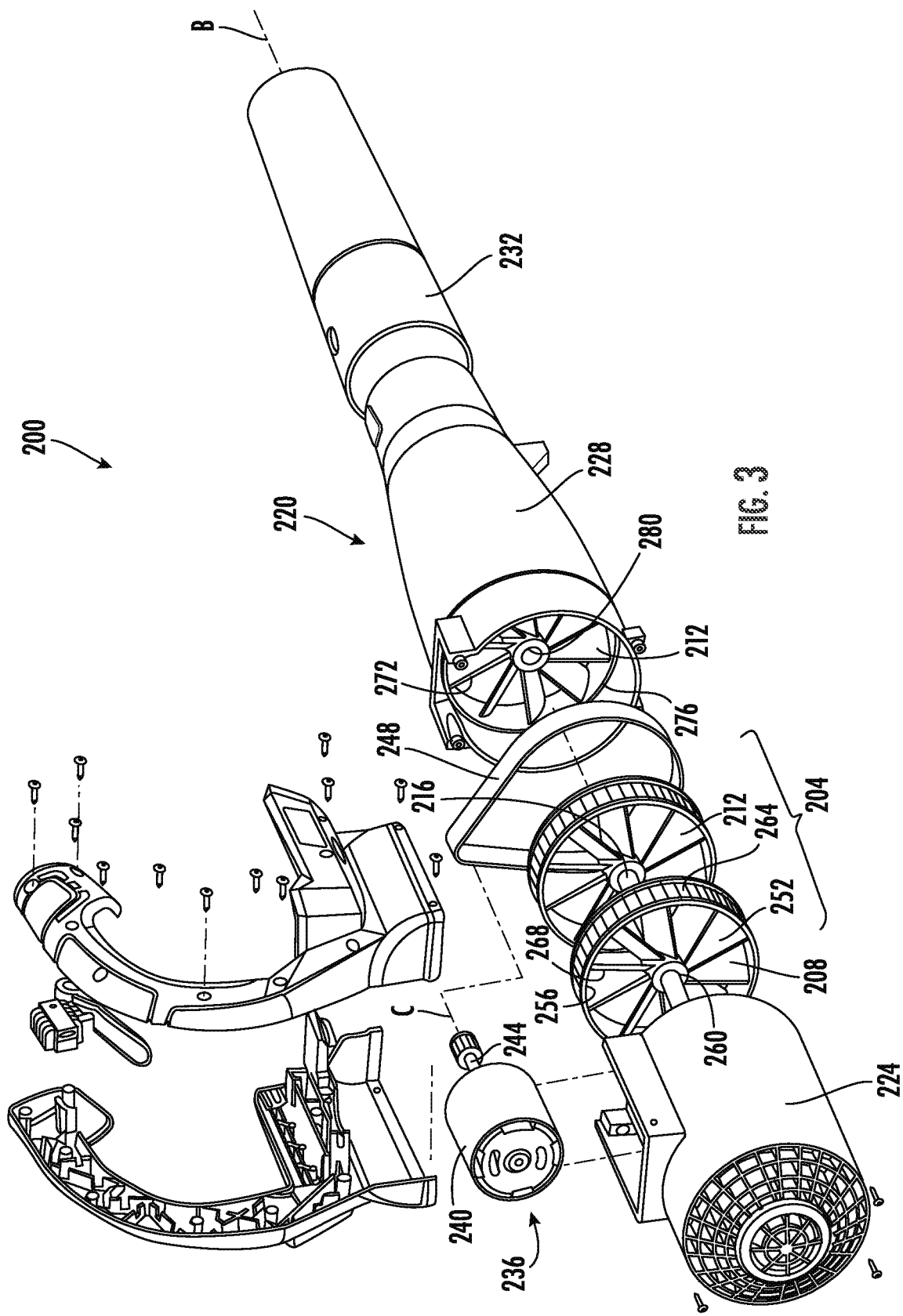
FIG. 3 provides an exploded, perspective view of an embodiment of the axial blower vacuum in accordance with an aspect of the present disclosure.

Referring now to FIG. 3, another embodiment of an axial blower vacuum 200 in accordance with aspects of the present disclosure is illustrated. The axial blower vacuum 200 may be configured substantially similarly as depicted and described in regard to the axial blower vacuum 10. The axial blower vacuum 200 includes a dual-fan assembly 204 having a first fan 208, a second fan 212, and a spindle 216 that couples the first fan 208 and the second fan 212 at opposite longitudinal ends of the spindle 216. The second fan 212 is illustrated in both an exploded position and an operating position in FIG. 3 The dual-fan assembly 204 is positioned within the inlet housing 34 and the outlet housing 38 such as described in regard to the fan assembly 78 of FIGS. 1 and 2.

The longitudinal axis of the fan assembly defines a fan assembly axis B. The fan assembly 204 is positioned coaxially within the inlet housing 34 and outlet housing 38. The fan assembly provided in FIG. 3 may be positioned in the space occupied by the motor 126 and fan 78 of the embodiment depicted in regard to FIGS. 1-2, such as may occupy more axial space than the axial blower vacuum 10.

An off-set motor assembly 236 including a motor 240, a drive shaft 244 whose longitudinal axis defines a motor axis C, and a belt 248. The motor axis C lies parallel with the fan assembly axis B, but the motor axis C is radially displaced from the fan assembly axis B. The belt 248 is coupled to the drive shaft 244 such that when the drive shaft 244 rotates the belt 248 rotates as well.

The first fan 208 of the dual-fan assembly 204 includes a plurality of first fan blades 252, a first fan wheel 256, and a first fan cavity 260 configured to couple to a first end of the spindle 216. The first fan wheel 256 has a recessed portion 264 on its perimeter surrounded on both longitudinal ends by raised edges 268. The recessed portion 264 is shaped so that the belt 248 can fit within the two raised edges 268. The raised edges 268 inhibit the belt 248 from slipping off of the first fan wheel 256.

The second fan 212 of the fan assembly 204 includes a plurality of second fan blades 272, a second fan wheel 276, and a second fan cavity 280 configured to couple to a second end of the spindle 216. The second fan 212 is spaced from the first fan 208 along the fan assembly axis B and is disposed at an opposite end of the spindle 216. Specifically, the second fan 212 is spaced from the first fan 208 in a direction toward an exhaust opening.

The belt 248 is coupled to the first fan wheel 256 such that when the belt 248 is rotated by the drive shaft 244, the belt 248 rotates the first fan wheel 256. In some embodiments, the belt 248 and the first fan wheel 256 are frictionally engaged. In still some embodiments, the belt 248 may have teeth which are shaped to fit in gaps of the first fan wheel 256. In still yet some embodiments, the belt 248 may be engaged in either fashion to the second fan wheel 276 or to both the first and the second fan wheel 256, 276. As one of ordinary skill will understand, other transmission systems may be employed that use belts or other drive members including but not limited to friction wheels, gears, chains, etc., or combinations thereof. Thus, the invention should not be limited to a transmission between the motor and the fan that includes a single belt.

Referring still to FIG. 3, the belt 248 engages the drive shaft 244 and the first fan wheel 256 to produce a speed ratio that is less than one. In other words, the motor 236 operates at a rotational speed that is greater than the rotational speed of the fan, such as to allow both the fan 204 and the motor 236 to operate at optimum speeds. In some embodiments, the speed ratio may be one or greater than one as required.

In addition to the dual fans 208, 212, the embodiment depicted in FIG. 3 may also include stationary guide vanes positioned downstream of the fans 208, 212 similar to those depicted and described in regard to FIG. 2.

The handle assembly 14 is sized to cover the motor 236 and belt 248 and the opening through which the belt 248 passes to engage the first fan wheel 256. Thus, the moving parts of the axial blower vacuum 200 are enclosed in the various housings.

Referring to FIGS. 1 and 2, in an exemplary operation of the axial blower vacuum 10, a user positions their hand around the grip portion 66 with at least one finger extended over the trigger 74. When the user pulls the trigger 74, the motor 126 becomes energized which begins to rotate the drive shaft 134. The fan 90, coupled to the drive shaft 134, begins to create a low pressure zone on the interior of the inlet housing 34. Air 170 begins to flow through the inlet 46 and through the fan assembly 78. Some of the air flow 170 travels over the plurality of interior fan blades 98 and into the motor 126 for cooling. That air 170 is then sucked out of the motor 126 and joins with the primary air 170 that has passed through the exterior fan blades 94 nearer the exterior of the passageway 166. The air flow 170 continues into openings of the guide vane housing 82. The guide vanes 118 direct air toward the tail cone assembly 86, which focuses the forced air 170 and directs it into the outlet housing 38. The inner diameter of the passageway 166 continues to decrease through the nozzle 42, further focusing the forced air 170 until it is expelled from the exhaust opening 50. To end the continued air flow 170, the user relaxes the trigger 74 which turns off the motor 126 and ceases rotation of the fan 90.

In operation of the vacuum function, the flow of air is similar but reversed in order of contact. The fan 90 is forced to rotate in a direction opposite of the blowing operation. The fan 90 creates a low pressure region on the interior of the nozzle 42, forcing air 170 from the atmosphere into the blower vacuum assembly 18. The air 170 continues through the blower vacuum assembly 18 until the air 170 exits at the inlet 46. As further described herein, in various embodiments, an inlet exhaust housing 340 directs air 170 from inlet opening 46 through inlet opening 346. In some embodiments, the inlet exhaust housing 340 directs air 170 from inlet opening 46 through an outlet opening 358. In still some embodiments, at least a portion of air 170 is allowed through the inlet opening 346 and the outlet opening 358.

Embodiments of the axial blower vacuum 10 depicted and described in regard to FIGS. 1 and 2 may operate similarly as described in regard to the axial blower vacuum 200 of FIG. 3. When the motor 240 is energized, the motor 240 rotates the drive shaft 244. The belt 248, such as may be frictionally coupled to the drive shaft 244, rotates the first fan 208 as the belt 248 is turned. The second fan 212 rotates with the first fan 208 through rotation of the spindle 216. When blowing, the rotation of the fan assembly 204 creates a low-pressure region at the inlet of the blower vacuum assembly 220, forcing air from the atmosphere through the inlet and toward the fan assembly 204. The first fan blades 252 force air from the inlet side of the passageway toward the second fan blades 212, which continue to force the air toward the exhaust. The forced air continues through the blower vacuum assembly 220 and out the guide cone 232 where it is further focused to increase speed and direction. The axial blower vacuum 200 is assembled such that none of the motor assembly 236 lies in a forced air flow path. This configuration maximizes the speed at which the air can flow from the inlet to the exhaust.

Figure 7:
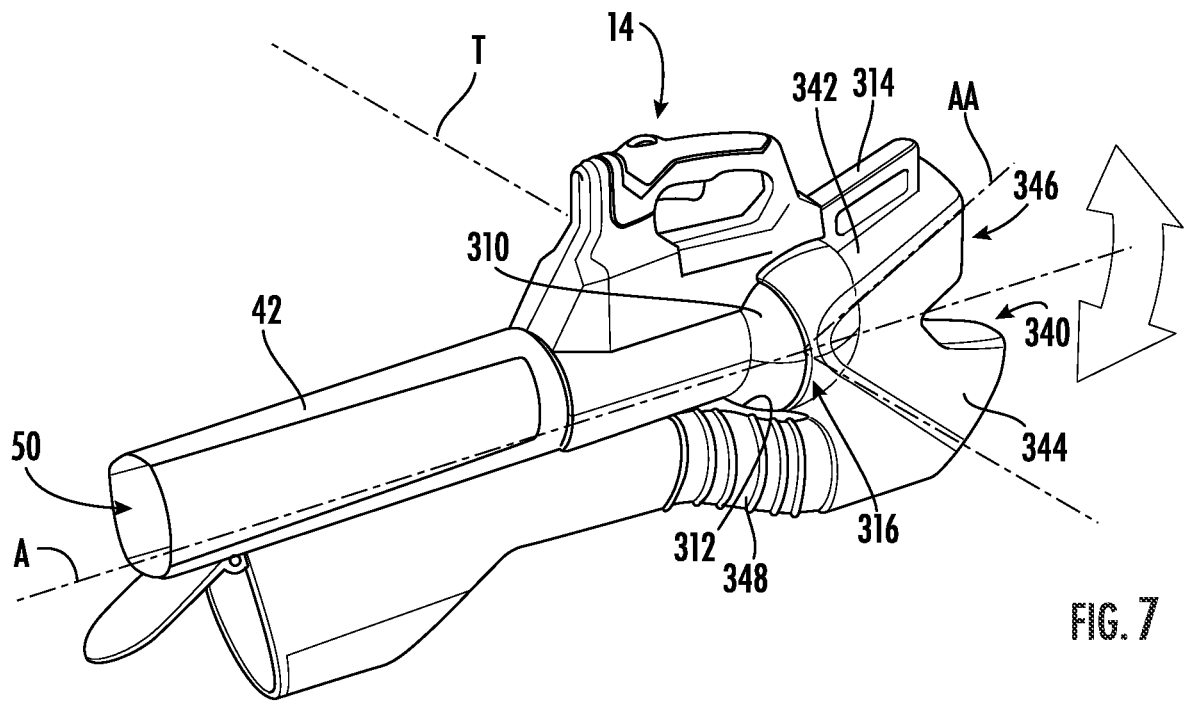
FIG. 7 provides a perspective view of an embodiment of an axial blower vacuum in accordance with an aspect of the present disclosure.
Figure 8:
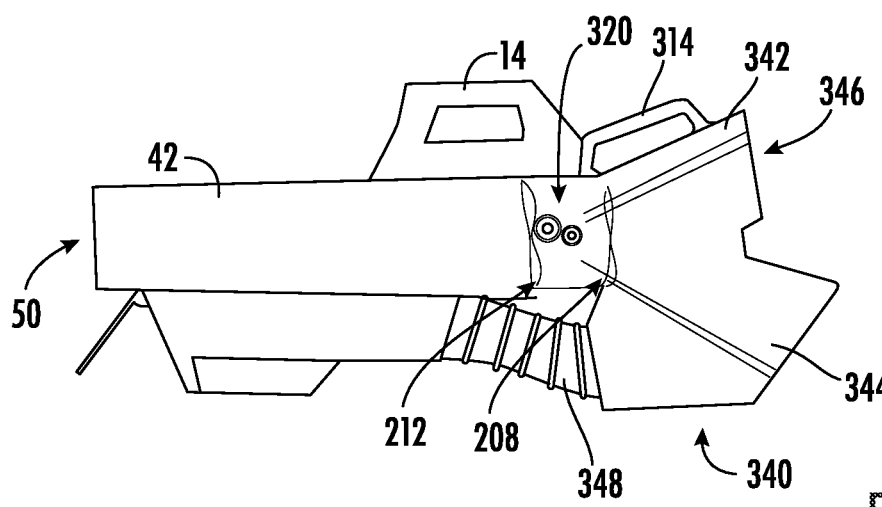
FIG. 8 provides a side view of an embodiment of an axial blower vacuum in accordance with an aspect of the present disclosure.

Referring now to FIGS. 4-11, embodiments of an axial blower vacuum 300 are provided including an inlet exhaust housing 340 configured to rotate along an axis to switch the axial blower vacuum 300 between blower and vacuum modes. Embodiments of the axial blower vacuum 300 may be configured substantially as depicted and described in regard to axial blower vacuums 10, 200 depicted and described in regard to FIGS. 1-3. Axial blower vacuum 300 includes a blower vacuum assembly 318, such as described in regard to blower vacuum assembly 18, 220. For instance, blower vacuum assembly 318 may include a fan assembly such as depicted and described in regard to fan assembly 78, 204. The blower vacuum assembly 318 includes a fan housing 310 configured to allow an inlet exhaust housing 340 to rotate about a transverse axis T perpendicular to an axial centerline axis A extending through the exhaust opening 50, such as depicted in FIG. 7.

Referring to FIG. 6, a partial cutaway view of the fan housing 310 is provided. The inlet opening 46 may be formed at an end of the fan housing 310, such as distal to the exhaust opening 50. The fan housing 310 may include a rounded body 312, such as forming, at least in part, a sphere, surrounding one or more fans within the fan housing 310. In the exemplary embodiment depicted, fans 208, 212 are positioned within the fan housing 310. A rotatable inlet exhaust housing 340 includes a rounded interface 316, such as may correspond to rounded body 312. The rounded interface 316 may allow the inlet exhaust housing 340 to rotate about the transverse axis T. In some embodiments, the inlet exhaust housing 340 is rotatable up to approximately 180 degrees (e.g., up to approximately 90 degrees above and below axial centerline axis A).

In various embodiments, inlet exhaust housing 340 includes an inlet portion 342 and an exhaust portion 344. Inlet portion 342 forms an inlet opening 346 configured to allow a flow of air therethrough such as described in regard to inlet opening 46. The inlet portion 342 extends from the rounded interface 316, such as to extend a flowpath from the fan housing 310 to the inlet opening 346. A handle 314 may be positioned at the inlet portion 342, such as to allow a user to grasp and rotate the inlet exhaust housing 340 such as described herein.

Figure 10:
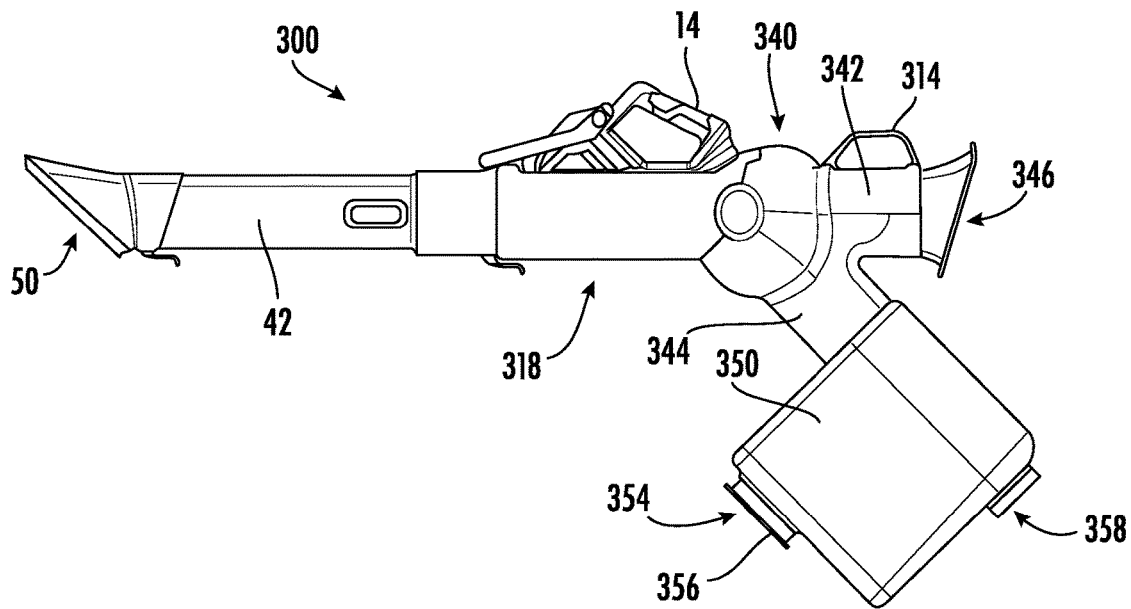
FIG. 10 provides a side view of an embodiment of an axial blower vacuum in a first position in accordance with an aspect of the present disclosure.

FIG. 4 and FIG. 10 each depict exemplary embodiments of the axial blower vacuum 300 at which the inlet exhaust housing 340 is rotated in a first position. In the exemplary embodiments, the inlet exhaust housing 340 is rotated to position the inlet opening 346 co-axial to the axial centerline axis A, such as depicted at inlet housing axis AA. Accordingly, inlet opening 46 at blower vacuum assembly 318 (internal view depicted at FIG. 6) is positioned co-axial to inlet opening 346 at the inlet portion 342 of the inlet exhaust housing 340. For instance, a flowpath between inlet openings 46, 346 is substantially straight along the axial centerline axis A.

Figure 9:
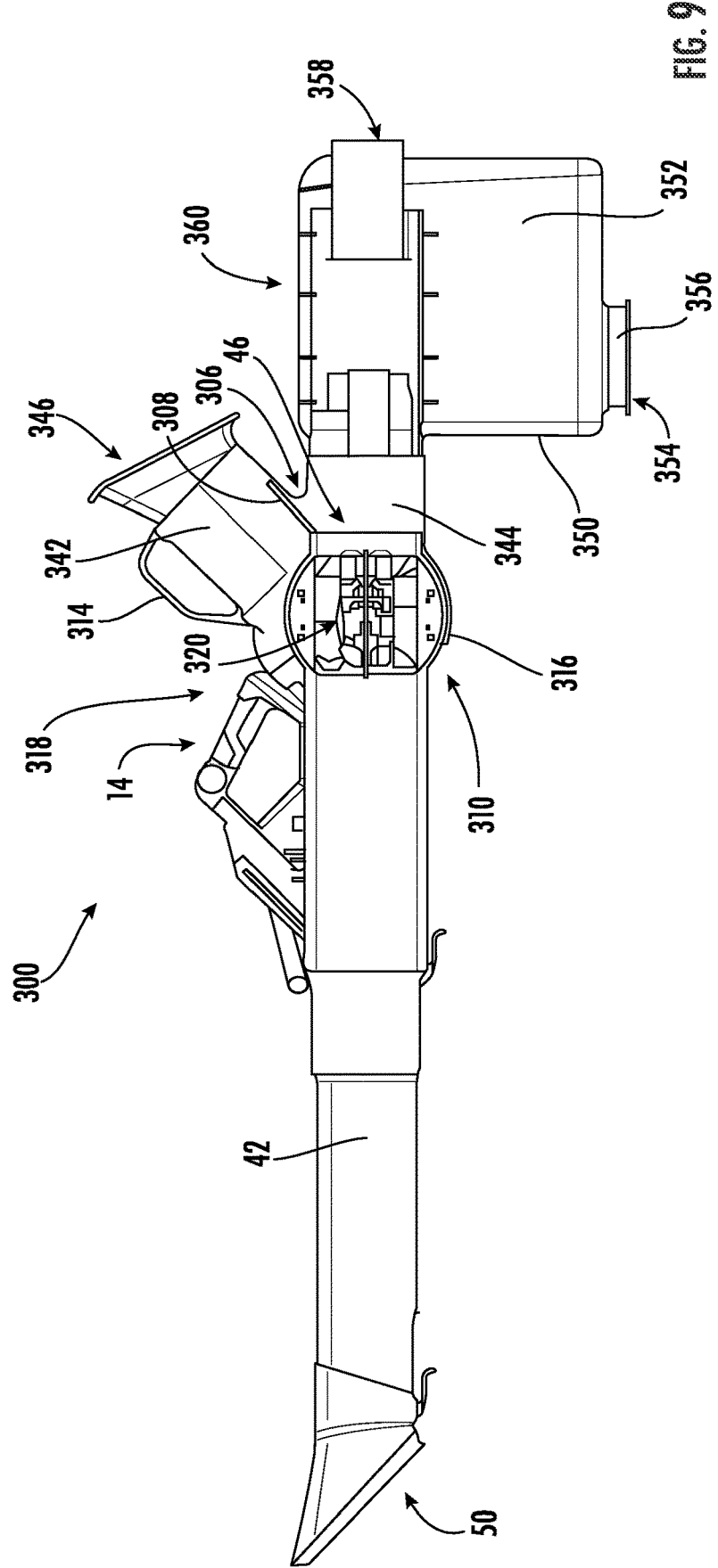
FIG. 9 provides a side view of an embodiment of an axial blower vacuum in accordance with an aspect of the present disclosure.
Figure 11:
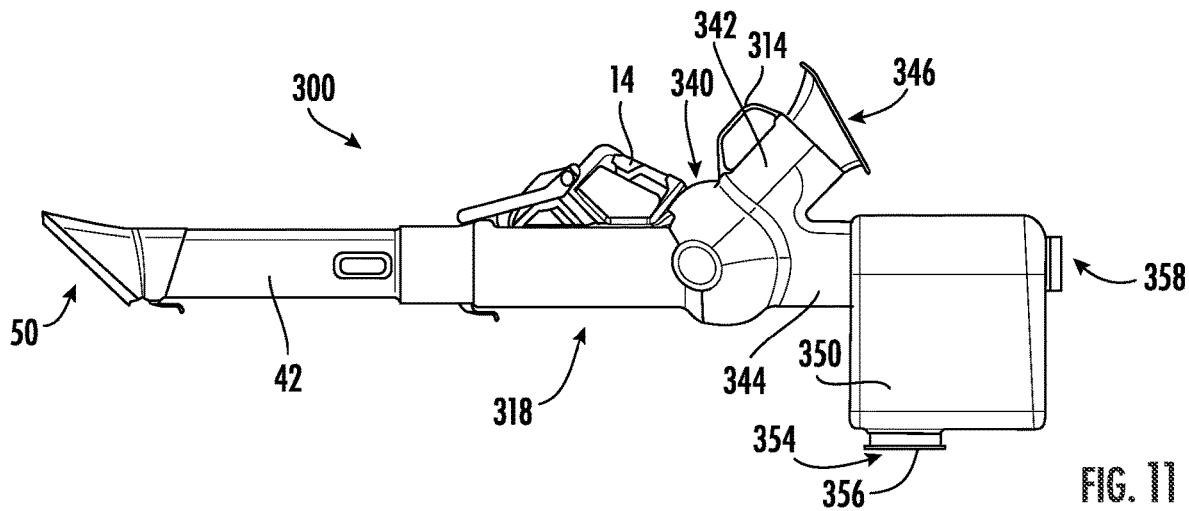
FIG. 11 provides a side view of an embodiment of an axial blower vacuum in a second position in accordance with an aspect of the present disclosure.

FIG. 5 and FIG. 11 each depict exemplary embodiments of the axial blower vacuum 300 at which the inlet exhaust housing 340 is rotated in a second position. For instance, the second position depicts the inlet housing axis AA approximately 45 degrees above the axial centerline axis A. In the exemplary embodiment, the inlet exhaust housing 340 is rotated such that the inlet housing axis AA is at an angle between the axial centerline axis A and a vertical axis V extending through a pivot point at the fan housing 310 and perpendicular to the axial centerline axis A. In some embodiments, the inlet exhaust housing 340 may rotate from co-axial or co-directional to the axial centerline axis A up or down up to approximately 90 degrees (e.g., approximately +/−90 degrees, or co-directional or co-axial to the vertical axis V, or up to approximately +/−60 degrees, or up to approximately +/−45 degrees). Accordingly, inlet opening 46 at blower vacuum assembly 318 (such as depicted at FIG. 9) is positioned in a different plane and at an angle relative to inlet opening 346 at the inlet portion 342 of the inlet exhaust housing 340.

In some embodiments, the inlet exhaust housing 340 may include a wall 308 extending across a transition passage 306 between the inlet portion 342 and the exhaust portion 344. The wall 308 extends to contact the inlet opening 46. In various embodiments, the wall 308 is a flexible or compliant material. The wall 308 may form a seal configured to inhibit flow of air or debris through the inlet portion 342 during vacuum operation or through the exhaust portion 344 during blower operation. For example, the wall 308 may be formed from a plastic material, a rubber material, or other material allowing for flexing, rubbing, or bending, or combinations thereof. When the axial blower vacuum 300 is in the first position, such as depicted in FIG. 4, the wall 308 extends across the transition passage 306 to contact the inlet opening 46 (e.g., at the bottom of the inlet opening 46) and obstruct flow into the exhaust portion 344. When the axial blower vacuum 300 is in the second position, such as depicted in FIG. 6, the wall 308 extends across the transition passage 306 to contact the inlet opening 46 (e.g., at the top of the inlet opening 46) and obstruct flow into the inlet portion 342.

Referring to FIGS. 4-11, the inlet exhaust housing 340 includes the exhaust portion 344 rotatable along with the inlet portion 342. For instance, referring to FIG. 4, the first position may further include the exhaust portion 344 rotating below the axial centerline axis A. Referring to FIG. 5, the second position may include at least a portion of the exhaust portion 344 positioned co-axial or co-directional to the axial centerline axis A. For instance, referring to FIG. 5, FIG. 9, and FIG. 11, at least a portion of a flowpath between inlet opening 46 and the exhaust portion 344 may be positioned substantially straight along the axial centerline axis A.

In various embodiments, a debris housing 350 is positioned at a distal flowpath end of the exhaust portion 344 relative to the fan housing 310. The debris housing 350 forms a debris plenum 352 configured to receive debris when the axial blower vacuum 300 operates in a vacuum mode. The debris housing 350 may form a debris opening 354 including a removable or articulatable door, cap, or wall 356. A user may selectively open the wall 356, such as by rotating, unscrewing, or prying open. In some embodiments, the debris housing 350 extends co-directional to an axial extension of the nozzle 42. The wall 356 is positioned at a distal end of the debris housing 350, such as proximate along the axial direction to exhaust opening 50. For instance, the wall 356 may be pivotably attached to the debris housing 350 or the nozzle 42, such as to allow the user to selectively open and close the debris opening 354 to release debris from within the debris housing 350.

In various embodiments, the wall 356 may include a spring mechanism, such as to configure the wall 356 as a spring-loaded door. For instance, a user may utilize a foot or hand to articulate the wall 356 open to allow debris at the debris body 350 to egress through opening 354.

Referring to FIG. 5, in some embodiments, the exhaust portion 344 forms a curved or tortious body, such as to direct a debris flowpath from the fan housing 310 in a first axial direction co-directional to the axial centerline axis A away from the exhaust opening 50 and along a curved or tortious route and along a second axial direction toward the exhaust opening 50.

In various embodiments, a duct 348 extends between the debris housing 350 and the exhaust portion 344. The duct 348 may form a flexible body allowing the duct 348 to contort, bend, or flex with actuation of the inlet exhaust body 350 between first and second positions. For instance, the duct 348 may form a corrugated tube allowing for expansion and contraction of the duct 348 along the axial direction. In various embodiments, the debris housing 350 may be fixed relative to the nozzle 42. For instance, the debris housing 350 may maintain a substantially fixed positioned along the axial direction relative to the nozzle 42. The flexible duct 348 may allow for movement of the exhaust portion 344 (e.g., between first and second positions) while maintaining a substantially fixed position of the debris housing 350.

Referring to FIGS. 15-18, in some embodiments, the exhaust portion 344 forms a flexible body allowing the duct 348 to contort, bend, or flex. For instance, the debris housing 350 may rest or slide upon the ground or be worn as a backpack. The flexible exhaust portion 344 may allow a user to move with the blower vacuum assembly 318 while the debris housing 350 stays in place or moves on the ground.

Referring to FIGS. 9-11, in some embodiments, the exhaust portion 344 forms a straight body, such as to direct a debris flowpath from the fan housing 310 along the first axial direction away from the exhaust opening 50. The debris housing 350 may form the debris plenum 352 offset from the straight debris flowpath extending from the fan housing 310. For instance, the debris plenum 352 and opening 354 may be positioned axially offset from the inlet opening 46 when in the second position, such as depicted in FIG. 9 and FIG. 11. The debris housing 350 may include an outlet opening 358 positioned substantially straight along the axial centerline axis A from the inlet opening 46 when in the second position.

In some embodiments, the axial blower vacuum 300 includes the inlet exhaust housing 340 operably coupled to the fan housing 310 by an actuation mechanism 320. The actuation mechanism 320 may include gears, belts, or linkages operably configured to rotate the inlet exhaust housing 340 relative to the fan housing 310, such as described herein. For instance, a user may articulate the handle 314 to rotate the inlet exhaust housing 340 between the first and second positions. The actuation mechanism 320 may include a lock device, snap, or gear mesh configured to affix the axial blower vacuum 300 into the first or second positions.

In still some embodiments, the actuation mechanism 320 is operably coupled to the fan assembly 78, 204 to change a flow direction corresponding to movement of the inlet exhaust housing 340 into the first position or the second position. For instance, the actuation mechanism 320 may be operably coupled to the inlet exhaust housing 340, such as the rounded interface 316. When the inlet exhaust housing 340 is rotated to the first position, the fan assembly 78, 204 is configured to rotate in a first direction corresponding to a blower operation, such as described herein. When the inlet exhaust housing 340 is rotated to the second position, the fan assembly 78, 204 is configured to rotate in a second direction corresponding to a vacuum operation, such as described herein.

In various embodiments of the axial blower vacuum 300 provided herein, the inlet opening 46, 346 functions as an air inlet into the fan housing 310 during blower operation. During a vacuum operation, inlet opening 46, 346 functions as an air outlet from the fan housing 310, such as depicted schematically via arrows 170 at FIG. 6.

Figure 12:
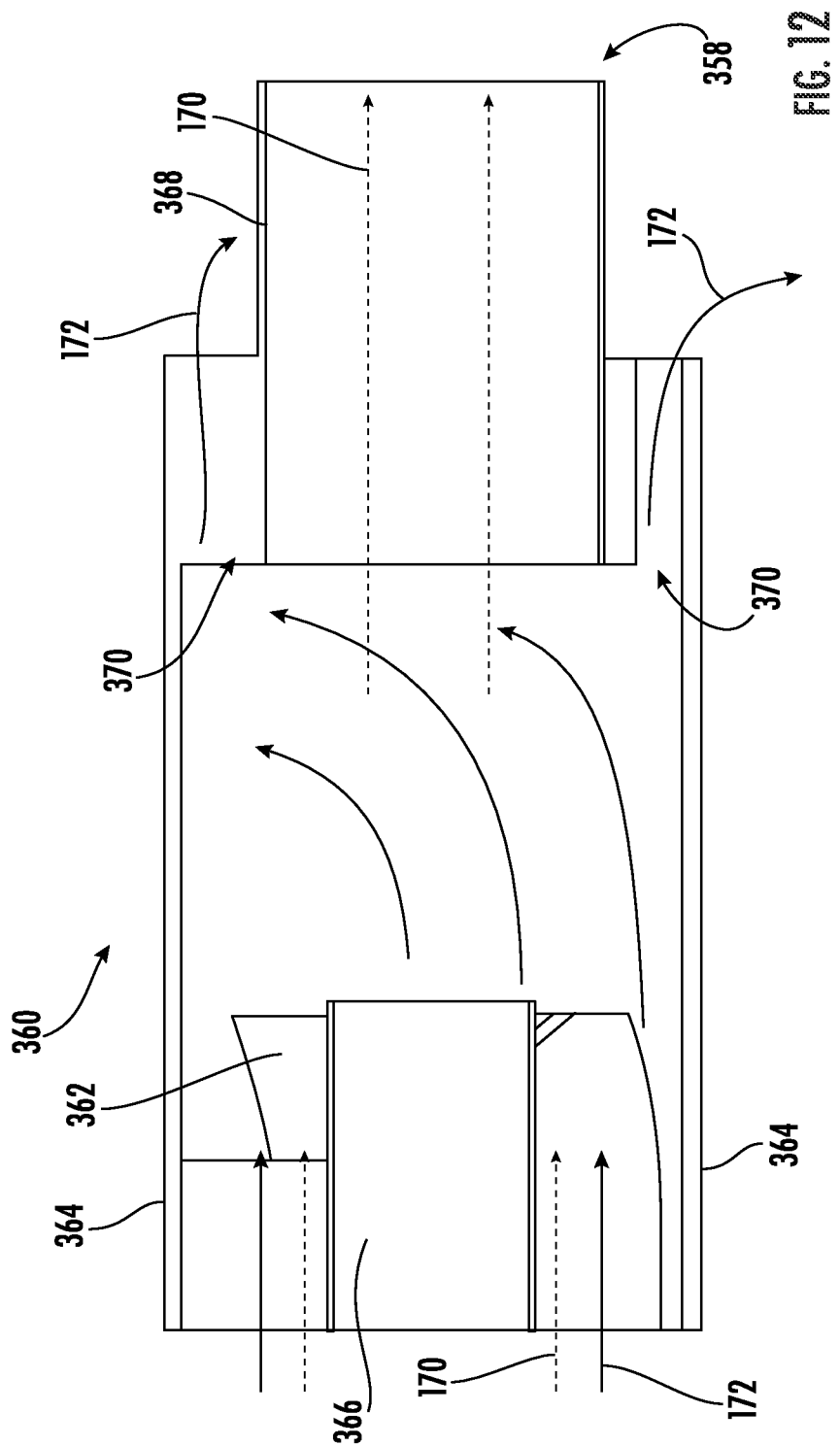
FIG. 12 provides a side view of an embodiment of a separator of an axial blower vacuum in accordance with an aspect of the present disclosure.
Figure 13:
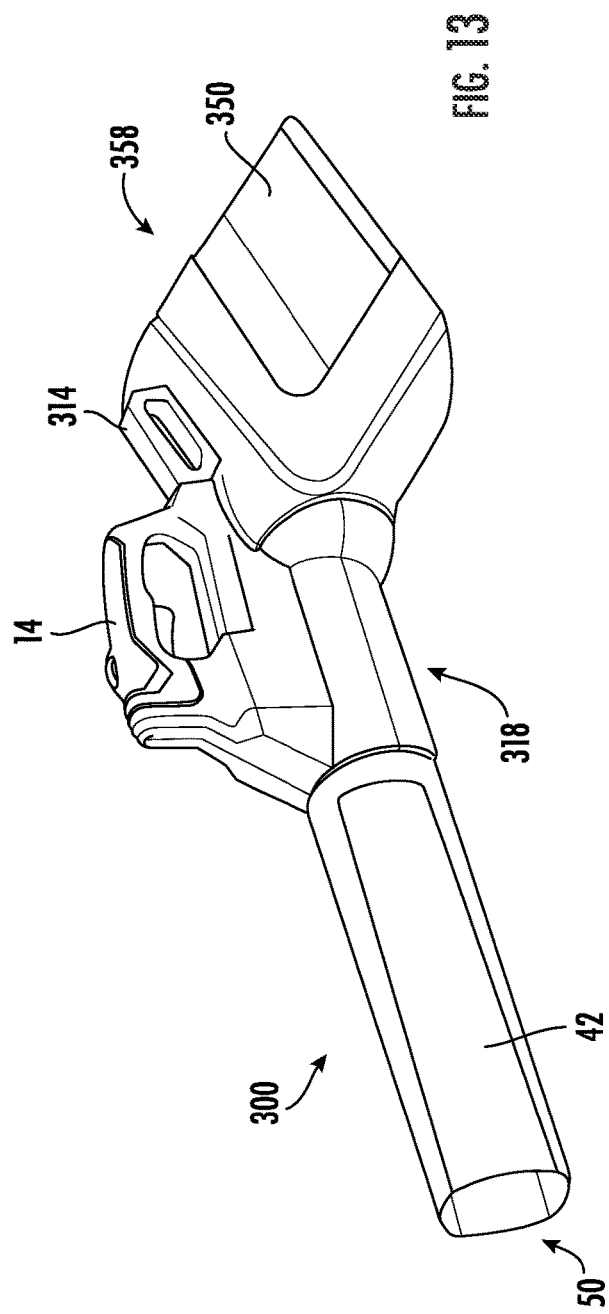
FIG. 13 provides a perspective view of an embodiment of an axial blower vacuum in accordance with an aspect of the present disclosure.
Figure 14:
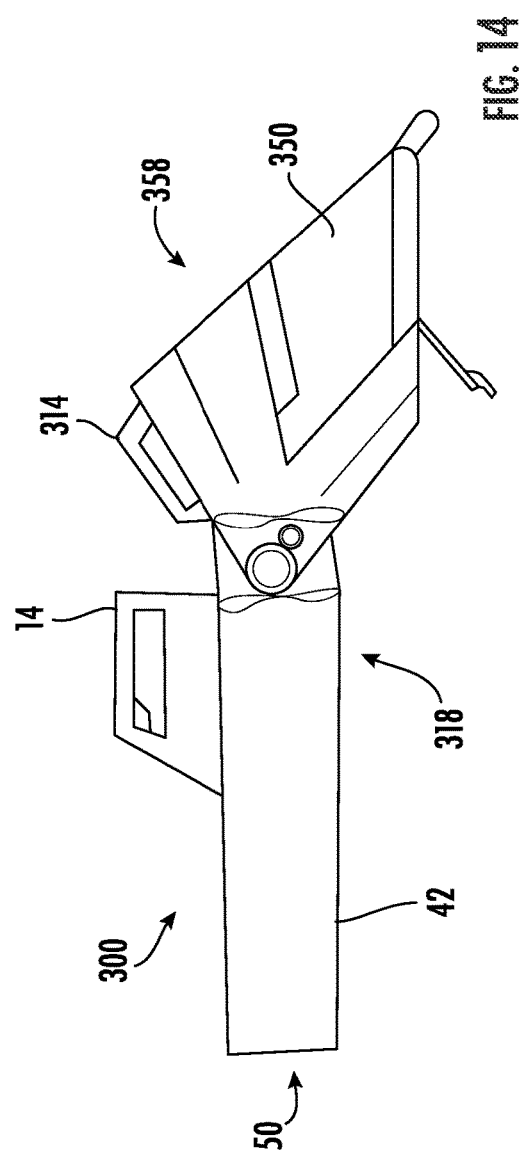
FIG. 14 provides a side view of an embodiment of an axial blower vacuum in accordance with an aspect of the present disclosure.
Figure 17:
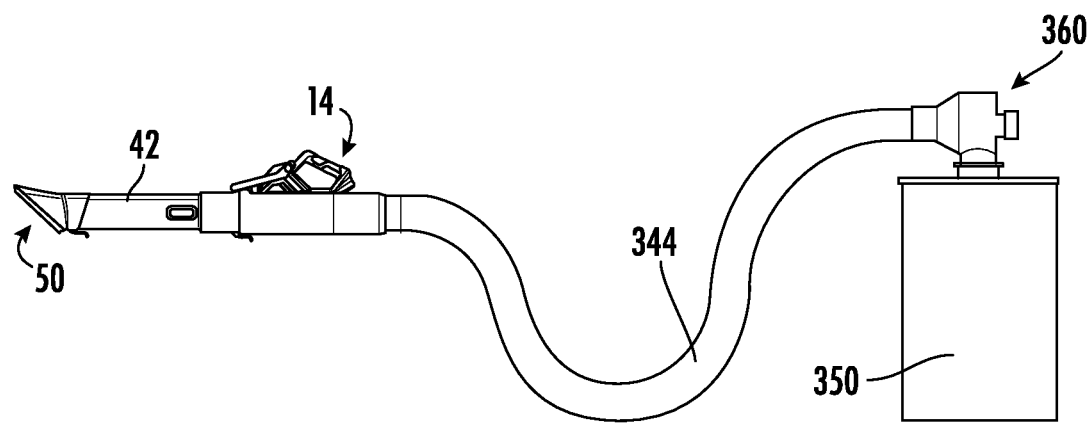
FIG. 17 provides a side view of an embodiment of an axial blower vacuum in accordance with an aspect of the present disclosure.
Figure 18:
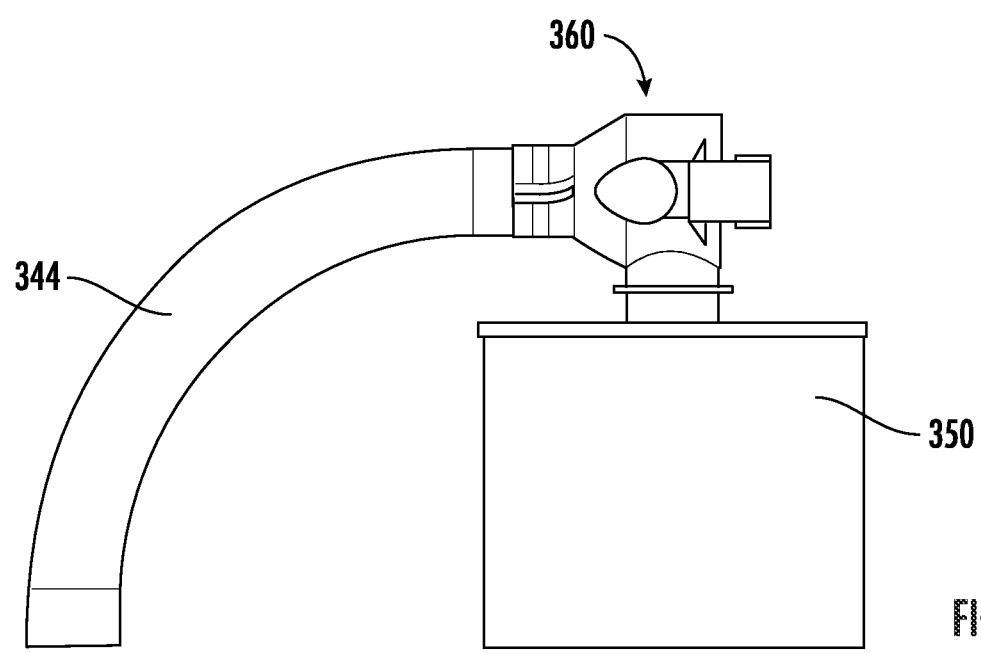
FIG. 18 provides a side view of a portion an embodiment of the axial blower vacuum of FIG. 17 in accordance with an aspect of the present disclosure.

Various embodiments of the axial blower vacuum 300 may include a debris separator 360. In some embodiments, the separator 360 may be included at the debris housing 350. For instance, the separator 360 may be positioned fluidly downstream of the inlet opening 46 (relative to flow of air 170 in vacuum mode). In still various embodiments, the separator 360 may be positioned generally between the inlet opening 46 and the debris plenum 352. Referring briefly to FIG. 12, the separator 360 may include vanes 362 configured to induce swirl on a mixed flow of air 170 and debris 172. For instance, the vanes 362 may extend along a radial direction from an inlet centerbody 366 extending axially or co-directional to the flow of air 170 entering the separator 360. The vanes 362 may extend radially and couple to or be integral with an outside wall 364 surrounding the inlet centerbody 366. Centrifugal motion induced by the swirl forces heavier particles, such as debris 172, to the outside wall 364. In some embodiments, outlet opening 358 is formed at an exhaust centerbody 368 positioned downstream of the vanes 362 (relative to a flow of air 170 in vacuum mode). The exhaust centerbody 368 may include vanes, members, pylons, or other structures configured to centrally position the exhaust centerbody 368 and allow an outer flowpath 370 between the outer wall 364 and exhaust centerbody 368 to extend to the debris plenum 352. Accordingly, the flow of debris 172 is separated from the flow of air 170, such as to allow air 170 to egress through the outlet opening 358 and capture debris 172 at the debris plenum 352.

Embodiments of the debris housing 350 depicted and described herein may include flexible mesh fabric materials, rigid shells, impermeable surfaces, or perforated surfaces (e.g., to allow dust to escape), and any appropriate materials for debris bags or canisters.

Further aspects of the invention are provided by one or more of the following embodiments:

1. A blower vacuum, the blower vacuum including a nozzle forming a first opening; a fan housing in fluid communication with the nozzle, the fan housing forming a second opening, wherein a fan assembly is positioned at the fan housing; an inlet exhaust housing rotatably coupled to the fan housing, the inlet exhaust housing including an inlet portion and an exhaust portion, wherein the inlet exhaust housing is rotatable to a first position forming a blower operation and a second position forming a vacuum operation; and a debris housing coupled to the exhaust portion of the inlet exhaust housing.

2. The blower vacuum of any one or more clauses herein, wherein the inlet exhaust housing is rotatable relative to a transverse axis perpendicular to an axial axis extending through the nozzle.

3. The blower vacuum of any one or more clauses herein, the inlet exhaust housing including a rounded interface corresponding at least in part to a rounded body at the fan housing.

4. The blower vacuum of any one or more clauses herein, wherein the inlet exhaust housing in the first position positions the second opening and a third opening at the inlet portion in axial alignment to one another.

5. The blower vacuum of any one or more clauses herein, wherein the inlet exhaust housing in the second position positions the second opening and a third opening at the inlet portion at an angle to one another.

6. The blower vacuum of any one or more clauses herein, including a duct extending between the exhaust portion and the debris housing.

7. The blower vacuum of any one or more clauses herein, wherein the duct is a flexible duct.

8. The blower vacuum of any one or more clauses herein, wherein the nozzle and the debris housing are fixed relative to one another.

9. The blower vacuum of any one or more clauses herein, wherein the debris housing forms a plenum, and wherein the debris housing includes an articulatable wall configured to selectively allow egress of debris from the plenum.

10. The blower vacuum of any one or more clauses herein, wherein the exhaust portion forms a tortious body configured to direct a debris flowpath from the fan housing in a first axial direction and along a curved flowpath toward a second axial direction toward a debris opening at the debris housing.

11. The blower vacuum of any one or more clauses herein, including an actuation mechanism configured to rotate the inlet exhaust housing relative to the fan housing.

12. The blower vacuum of any one or more clauses herein, wherein the actuation mechanism is operably coupled to the fan assembly to change a flow direction corresponding to the first position and the second position.

13. The blower vacuum of any one or more clauses herein, wherein the actuation mechanism is a gear assembly, a belt assembly, or combinations thereof.

14. The blower vacuum of any one or more clauses herein, including a separator positioned fluidly between the fan assembly and a plenum at the debris housing.

15. The blower vacuum of any one or more clauses herein, wherein the separator includes a plurality of vanes extending along a radial direction from an inlet centerbody.

16. The blower vacuum of any one or more clauses herein, wherein the separator includes an exhaust centerbody, wherein the exhaust centerbody forms an outer flowpath in fluid communication with the plenum, and wherein an exhaust opening is formed at an inner flowpath formed at the exhaust centerbody.

17. The blower vacuum of any one or more clauses herein, the inlet exhaust housing including a handle configured to allow a user to articulate the inlet exhaust housing to the first position and the second position.

18. The blower vacuum of any one or more clauses herein, wherein the inlet exhaust housing is rotatable up to approximately 90 degrees above and below an axial centerline axis extending through the nozzle.

19. The blower vacuum of any one or more clauses herein, the debris housing including a removable wall, wherein the wall is a cap selectively sealing debris in a plenum at the debris housing.

20. The blower vacuum of any one or more clauses herein, the blower vacuum including a first handle and a second handle, the first handle including a trigger assembly configured to operate the fan assembly, the second handle coupled to the inlet exhaust housing.

21. A blower vacuum, the blower vacuum including a nozzle forming a first opening; a fan housing in fluid communication with the nozzle, the fan housing forming a second opening, wherein a fan assembly is positioned at the fan housing; a debris housing forming a plenum in fluid communication with the second opening at the fan housing; and a separator positioned fluidly between the fan assembly and the plenum at the debris housing, wherein the separator includes a plurality of vanes extending along a radial direction, the plurality of vanes extending from an inlet centerbody toward an outside wall surrounding the inlet centerbody.

22. The blower vacuum of any one or more clauses herein, wherein the separator includes an exhaust centerbody positioned downstream of the inlet centerbody relative to a flow of air from the fan assembly, wherein an outer flowpath is formed between the exhaust centerbody and the outside wall, wherein the outer flowpath extends in fluid communication to the plenum at the debris housing, and wherein the exhaust centerbody forms an inner flowpath in fluid communication with an exhaust opening.

23. The blower vacuum of any one or more clauses herein, wherein the outer flowpath is positioned radially around the exhaust centerbody, and wherein the inner flowpath is positioned radially inward of the outer flowpath, and wherein the exhaust centerbody separates the outer flowpath and the inner flowpath.

24. The blower vacuum of any one or more clauses herein, wherein the plurality of vanes is configured to induce swirl at a flow of air from the fan assembly.

25. The blower vacuum of any one or more clauses herein, wherein the plurality of vanes is integral to the outside wall.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blower vacuum, the blower vacuum comprising:
   a nozzle forming a first opening;
   a fan housing in fluid communication with the nozzle, the fan housing forming a second opening, wherein a fan assembly is positioned at the fan housing;
   an inlet exhaust housing coupled to the fan housing, the inlet exhaust housing comprising an inlet portion and an exhaust portion, wherein the inlet exhaust housing is moveable to a first position forming a blower operation and a second position forming a vacuum operation;
   a debris housing forming a plenum in fluid communication with the second opening at the fan housing; and
   a separator positioned fluidly between the fan assembly and the plenum at the debris housing, wherein the separator comprises a plurality of vanes extending along a radial direction, the plurality of vanes extending from an inlet centerbody toward an outside wall surrounding the inlet centerbody.

2. The blower vacuum of claim 1, wherein the separator comprises an exhaust centerbody positioned downstream of the inlet centerbody relative to a flow of air from the fan assembly.

3. The blower vacuum of claim 2, wherein an outer flowpath is formed between the exhaust centerbody and the outside wall, and wherein the outer flowpath extends in fluid communication to the plenum at the debris housing.

4. The blower vacuum of claim 3, wherein the exhaust centerbody forms an inner flowpath in fluid communication with an exhaust opening.

5. The blower vacuum of claim 3, wherein the outer flowpath is positioned radially around the exhaust centerbody.

6. The blower vacuum of claim 5, wherein the inner flowpath is positioned radially inward of the outer flowpath.

7. The blower vacuum of claim 6, wherein the exhaust centerbody separates the outer flowpath and the inner flowpath.

8. The blower vacuum of claim 1, wherein the plurality of vanes is configured to induce swirl at a flow of air from the fan assembly.

9. The blower vacuum of claim 1, wherein the plurality of vanes is integral to the outside wall.

10. The blower vacuum of claim 1, the debris housing comprising a removable wall, wherein the wall is a cap selectively sealing debris in the plenum at the debris housing.

11. The blower vacuum of claim 1, wherein the separator is positioned in the debris housing, the separator comprising an exhaust centerbody positioned downstream of the inlet centerbody relative to a flow of air from the fan assembly, wherein an outer flowpath is formed between the exhaust centerbody and the outside wall, and wherein the outer flowpath extends in fluid communication to the plenum at the debris housing, and wherein the exhaust centerbody forms an inner flowpath in fluid communication with an exhaust opening at the debris housing.

12. The blower vacuum of claim 1, wherein the separator comprises an exhaust centerbody positioned downstream of the inlet centerbody relative to a flow of air from the fan assembly, wherein the exhaust centerbody forms an inner flowpath in fluid communication with an exhaust opening, and wherein the inlet exhaust housing in the second position positions the second opening and an exhaust opening at the inlet portion in axial alignment to one another.

13. The blower vacuum of claim 12, wherein the inlet exhaust housing in the first position positions the second opening and the first opening in axial alignment to one another.

\* \* \* \* \*